United States Patent Office 2,697,723
Patented Dec. 21, 1954

2,697,723

SEPARATION OF ISOPHTHALIC AND TEREPHTHALIC ACID MIXTURES

Earl F. Carlston and Funston G. Lum, Richmond, Calif., assignors to California Research Corporation, San Francisco, Calif., a corporation of Delaware No Drawing. Application June 26, 1952,
Serial No. 295,818

17 Claims. (Cl. 260—525)

The present invention relates to a method of separating mixtures of isophthalic acid and terephthalic acid. More specifically, the invention concerns a process for separating mixtures of isophthalic acid and terephthalic acid in the form of their alkali metal salts.

Isophthalic acid and terephthalic acid are commonly prepared by the oxidation of meta and paraxylenes. These isomeric xylenes are exceedingly difficult to separate by conventional methods due to the close similarity of their physical properties. Separation of the mixed isophthalic and terephthalic acids produced by oxidation of isomeric mixtures of meta- and para-xylenes has therefore been suggested as an alternative. Unfortunately, however, the separation of mixtures of isophthalic and terephthalic acids is not without its problems. Conventional methods of separation such as fractional distillation, as applied to mixtures of these acids, are impractical since terephthalic acid has a tendency to sublime and isophthalic acid has such a high melting point there is always danger of thermal decomposition. On the other hand, when the mixtures of isophthalic acid and terephthalic acid are esterified with lower aliphatic alcohols to produce liquid mixtures subject to distillation, the boiling points of the isophthalates and terephthalates are found to be so close that the compounds cannot be effectively separated by fractional distillation.

It has now been discovered that the alkali metal salts of terephthalic acid are substantially completely insoluble in saturated aqueous solutions of the same alkali metal salt of isophthalic acid, mixtures of the same alkali metal salt of isophthalic acid, orthophthalic acid, benzoic acid, toluic acid, and inorganic hydroxides or salts of the same alkali metal, such as the chloride, the carbonate, the sulfate, the nitrate, etc., and in saturated solutions of the inorganic salts alone. This is surprising since the alkali metal salts of terephthalic acid are quite soluble in water.

Based on the foregoing discovery, a process for separating mixtures of alkali metal salts of terephthalic acid and the same alkali metal salt of isophthalic acid has been developed which comprises forming an intimate mixture of the salts with a quantity of water insufficient to dissolve all of the salts and separating a solid phase and a liquid phase from the mixture.

By the process according to this invention it is possible to separate isomeric mixtures of isophthalic acid and terephthalic acid into essentially pure isophthalic acid and terephthalic acid. The acids are converted to their alkali metal salts by conventional means known to the art as hereinafter disclosed. Upon intimately mixing the alkali metal isophthalate and alkali metal terephthalate mixture with water insufficient to dissolve all of the salts, and separating a solid phase and a liquid phase, essentially pure alkali metal isophthalate or alkali metal terephthalate, or both, are obtained. When the water is not only insufficient to dissolve all of the salts, but also insufficient to dissolve all of the more soluble alkali metal isophthalate, the liquid phase consists of essentially pure alkali metal isophthalate in saturated aqueous solution since the alkali metal terephthalate is substantially completely insoluble in such a solution. When the amount of water employed is insufficient to dissolve all of the salts but is, however, sufficient to dissolve all of the alkali metal isophthalate as well as part of the alkali metal terephthalate, the solid phase separated from the aqueous mixture consists of essentially pure alkali metal terephthalate. When the water employed is insufficient to dissolve all of the salts, but just sufficient to dissolve all of the alkali metal isophthalate, a substantially complete separation of the alkali metal isophthalate and alkali metal terephthalate mixture into its pure components results.

The solid phase in the above latter two separations generally consists of a mixture of terephthalate salt and some adherent saturated solution of isophthalate salt. The amount of saturated solution of isophthalate salt that adheres to the crystals of solid terephthalate salt is variable and depends on the efficiency of filtration. In a powerful centrifuge, for example, the amount of saturated solution of isophthalate salt that remains in the cake of terephthalate salt is small. However, even this small amount of saturated solution of isophthalate salt must be removed if a substantially pure terephthalic acid is to be obtained.

As shown in Table I below, alkali metal terephthalates are substantially insoluble in concentrated aqueous solutions of some inorganic salts of the same alkali metal. Alkali metal isophthalates and their saturated solutions are quite soluble in concentrated aqueous solutions of the same alkali metal inorganic salts. These facts make it possible to remove all of the alkali metal isophthalate from the crystals of alkali metal terephthalate by washing the cake of terephthalate salt with a concentrated solution of inorganic salt of the same alkali metal. Saturated solutions of inorganic salts may be used as washes, but it is only necessary that the alkali metal terephthalates should be substantially completely insoluble in the wash solution while the alkali metal isophthalates and their solutions should be soluble in the wash solution. For example, a 45% solution of potassium carbonate in water is shown in Table I as being preferred over a saturated solution. Many other less than saturated inorganic alkali metal salt solutions may be found to be useful as wash liquids.

TABLE I

*Solubility of terephthalate salts at 25° C.*

Per cent by weight

Sodium terephthalate:
In water _____ 14
In saturated sodium isophthalate solution____ <0.2
In saturated sodium chloride solution_____ <0.2

Potassium terephthalate:
In water _____ 21
In saturated potassium isophthalate solution__ <0.2
In 45% potassium carbonate solution_____ <0.2

Ammonium terephthalate:
In water _____ 10
In saturated ammonium isophthalate solution__ <0.2
In saturated ammonium sulfate solution_____ <0.2

In addition to the use of concentrated solutions of inorganic alkali metal salts as wash liquids, it is also possible to use water alone as a wash liquid. The use of water, however, may require an efficient countercurrent washing system with careful control.

Following their separation the alkali metal isophthalates and alkali metal terephthalates are readily reconverted to isophthalic acid and terephthalic acid by conventional methods.

The separation, according to the process of this invention, is adaptable to mixtures of any alkali metal salts of isophthalic acid with the same alkali metal salt of terephthalic acid. The process of separating isophthalic and terephthalic acids in the form of their alkali metal salts is also applicable to mixtures of isophthalic and terephthalic acids containing orthophthalic acid, benzoic acid, toluic acids, etc., such as may be obtained by the oxidation of natural crude xylenes. No change in the process of separation is required because of these other more soluble organic acids. The separated alkali metal isophthalate solution and the alkali metal terephthalate cake are separately dissolved in water and acidified with mineral acid to liberate the isophthalic and terephthalic acids, and washed with water, whereupon the more soluble organic acids are removed in the water washes. The term "alkali metal" as used throughout the specification and claims includes ammonium as well as the true alkali metals such as sodium and potassium.

The alkali metal salts of isophthalic and terephthalic acid, as mentioned before, may be prepared from the acids or their various derivatives according to conventional methods. They may be prepared directly from the isophthalic and terephthalic acids by neutralization with sodium hydroxide, potassium hydroxide, ammonium hydroxide, etc. Dialkyl esters of the acids and lower alkyl alcohols may be converted by saponification with a slight excess of aqueous sodium hydroxide, potassium hydroxide, etc. Acid-amide mixtures of isophthalic and terephthalic acid made by oxidation of mixtures of meta- and para-xylene, according to the process of copending U. S. application Serial No. 168,849 of William G. Toland, now abandoned, are convertible to the alkali metal salts by caustic hydrolysis with aqueous sodium hydroxide or potassium hydroxide.

In the process, according to this invention, the isophthalic and terephthalic acids are preferably converted to their alkali metal satls simultaneously with the formation of the intimate aqueous mixture. This is accomplished by combining the mixed acids with an aqueous solution containing stoichiometric amounts of sodium hydroxide, potassium hydroxide, ammonium hydroxide, etc. to neutralize the acids and water insufficient to dissolve all of the alkali metal isophthalate and terephthalate thus formed.

As already stated, the amount of water employed in separating the alkali metal isophthalate and alkali metal terephthalate mixtures, according to the process of this invention, may be in any amount insufficient to dissolve all of the salts when the mixture has been brought into equilibrium, as by intimate mixing of the solid and liquid phases. It is not necessary, however, that the amount of water employed be at the outset insufficient to dissolve all of the alkali metal isophthlate and alkali metal terephthalate. For example, the salts may be completely dissolved in water, following which the solution may be evaporated while agitating to insure intimate mixing until a solid phase comprising the less soluble alkali metal terephthalate is obtained. In the case of ammonium salts, ammonia that is lost during boiling is replaced as required.

It is possible, in accordance with the preferred practice of this invention, to effect a substantially complete separation of the alkali metal isophthalate and alkali metal terephthalate mixture in a single operation. In such case, the amount of water employed either at the outset or after evaporation is just sufficient to entirely dissolve the alkali metal isophthalate. This amount is simply determined, for example, by forming a saturated solution of the particular alkali metal isophthalate in question at the desired temperature for carrying out the separation. An aliquot portion of this saturated solution is then analyzed by any convenient method. By measurement of the amount of alkali metal isophthalate salt thus obtained from a given amount of solution the percentage of water, based on the alkali metal isophthalate present in the mixture to be separated, is determined. As examples of such determinations, it has been found that sodium, potassium, and ammonium isophthalate are soluble in water at 25° C. to approximately the amounts shown in the following table:

TABLE II

*Solubility of isophthalate salts in water at 25° C.*

[Concentration of salts in saturated solutions.]

| | Per cent by weight |
|---|---|
| Sodium isophthalate | 37 |
| Potassium isophthalate | 53 |
| Ammonium isophthalate | 45 |

From the above it may be calculated that approximately 170% by weight of water based on the amount of sodium isophthalate is required to effect a substantially complete separation of a mixture of sodium isophthalate and sodium terephthalate at about 25° C. Approximately 120% by weight of water is necessary for the ammonium salts.

It is also possible, in accordance with the practice of this invention, to effect a substantially complete separation of the alkali metal isophthalate and alkali metal terephthalate mixture by adding an inorganic salt of the same alkali metal to a complete solution of the mixture of alkali metal isophthalate and terephthalate in water. Sufficient water is added to the mixture of alkali metal isophthalate and alkali metal terephthalate to completely dissolve the salts and then a dry inorganic salt of the same alkali metal is added, with stirring, in an amount sufficient to form a solution saturated with respect to the inorganic alkali metal salt and alkali metal isophthalate. The alkali metal terephthalate salt is substantially completely insoluble in such mixtures of saturated solutions. The solid phase and the liquid phase resulting from this mixture are conveniently separated by conventional methods. The solid phase consists of a mixture of alkali metal terephthalate and an adherent mother liquor containing a mixture of alkali metal isophthalate and the inorganic salt of the alkali metal. The mother liquor is removed by washing with a saturated solution of the inorganic salt of the alkali metal.

Separations of mixtures of alkali metal isophthalate and alkali metal terephthalate, according to the process of this invention, may be carried out at any practical temperature. Room temperatures such as about 25° C., as noted above, are particularly convenient. Effective separations may also be accomplished at higher temperatures, even exceeding the boiling point of the saturated solution when superatmospheric pressures are employed.

The solid phase and the liquid phase formed by the process of this invention are conveniently separated by any of the commonly-known methods for separating solids from liquids. Such methods may involve sedimentation including the use of continuous rotating thickeners and centrifuges. For present purposes, filtration with vacuum or centrifuge has been found to be a very practical means of separation. Decantation may be resorted to if complete phase separation is not required.

The solid phase separated from the aqueous mixture by sedimentation, filtration, etc. contains the less soluble alkali metal terephthalate of the mixture of alkali metal isophthalate and alkali metal terephthalate. Mother liquor adhering to the precipitate or filter cake may contain alkali metal isophthalate, or certain amounts of undissolved alkali metal isophthalate may be present. The alkali metal terephthalate may be purified of such alkali metal isophthalate by repeated washing of the precipitate or filter cake with saturated aqueous solutions of hydroxides or inorganic salts of the same alkali metal, such as the alkali metal chlorides, alkali metal sulfates, alkali metal nitrates, etc.

The alkali metal isophthalates and alkali metal terephthalates separated in accordance with the process of this invention may be converted to isophthalic acid and terephthalic acid by any conventional method. For present purposes, it has been found convenient to dissolve the separated alkali metal isophthalate or terephthalate in water and precipitate the phthalic acid by addition of a mineral acid such as hydrochloric acid or sulfuric acid.

Although it is believed that the practice of the present invention will be clear to one skilled in the art from the foregoing discussion, the following simplified examples are offered as further illustrations. Unless otherwise specified, the proportions given are on a weight basis.

*Example 1.*—73.5 parts of isophthalic acid and 26.5 parts of terephthalic acid were dissolved in sodium hydroxide solution to complete neutralization of the acids. After filtration to remove insoluble impurities the solution was boiled until a slurry of precipitated sodium salt formed. Additional water was removed by boiling until the weight of water in the slurry was 53% of the total weight. The slurry was then filtered on a vacuum filter to remove as much of the mother liquor as possible. The moist cake was slurried with saturated sodium chloride solution and filtered on a vacuum filter to remove as much of the mother liquor as possible. The moist cake was then repeatedly washed with saturated sodium chloride solution until the filtrate showed no isophthalic acid. The filter cake was dissolved in water and hydrochloric acid was added in excess to precipitate the terephthalic acid. The terephthalic acid was filtered and the cake washed with water until the filtrate was free of hydrochloric acid and sodium chloride. Substantially complete recovery of the terephthalic acid in the original solution was obtained. All of the sodium isophthalate solution filtrate and all of the sodium chloride wash solution filtrates were combined and acidified with hydrochloric acid. After repeatedly washing with water to remove all of the hydrochloric acid and sodium chloride, substantially complete recovery of the isophthalic acid in the original solution was obtained.

*Example 2.*—83.0 parts of a mixture of isophthalic acid and terephthalic acid containing approximately 85% isophthalic acid and 15% terephthalic acid by spectroscopic analysis were dissolved in a boiling solution consisting of 250 parts water and 101 parts of approximately 40% sodium hydroxide solution. After boiling to concentrate the solution and precipitate our sodium terephthalate, the mixture amounted to 281 parts by weight. The insoluble sodium terephthalate was separated by filtration through a fritted glass Büchner-type funnel. The filter cake was washed several times with a saturated sodium chloride solution to remove mother liquor containing sodium isophthalate until the filtrate showed no isophthalic acid. The sodium terephthalate filter cake was then dissolved in 200 parts of water and the solution filtered. The solution was heated to near boiling and 40 parts of 4 normal hydrochloric acid were added slowly to precipitate terephthalic acid. The precipitated terephthalic acid was separated by filtration through a fritted glass Büchner-type funnel and was washed repeatedly with water, until the filtrate was free of hydrochloric acid and sodium chloride. The terephthalic acid filter cake on drying showed a yield of 12.4 parts by weight, indicating substantially complete recovery of the terephthalic acid from the mixture. All of the sodium isophthalate solution filtrate and all of the sodium chloride wash solution filtrates were combined and acidified with hydrochloric acid to recover the isophthalic acid.

*Example 3.*—95 parts of a mixture of isophthalic acid and terephthalic acid containing approximately 70% isophthalic acid and 30% terephthalic acid by spectroscopic analysis were dissolved in a solution of 389 parts water and 116 parts of approximately 40% sodium hydroxide solution. 130 parts of dry sodium chloride were added. After the sodium chloride was dissolved and the sodium terephthalate was precipitated the slurry was filtered through a fritted glass Büchner-type funnel. The filter cake was washed several times with a saturated sodium chloride solution to remove mother liquor containing sodium isophthalate, until the filtrate showed no isophthalic acid. The sodium terephthalate filter cake was then dissolved in water and the solution filtered. The solution was heated to boiling and the terephthalic acid was precipitated by adding hydrochloric acid in excess. The precipitated terephthalic acid was filtered and washed repeatedly with water until the filtrate was free of hydrochloric acid and sodium chloride. Substantially complete recovery of the terephthalic acid in the original solution was obtained. All of the sodium isophthalate solution filtrate and all of the sodium chloride wash solution filtrates were combined and acidified with hydrochloric acid. After repeatedly washing with water to remove all of the hydrochloric acid and sodium chloride, substantially complete recovery of the isophthalic acid in the original solution was obtained.

*Example 4.*—60 parts of a mixture of isophthalic acid and terephthalic acid containing approximately 85% isophthalic acid and 15% terephthalic acid by spectroscopic analysis were dissolved in a boiling solution of water and potassium hydroxide. The solution was neutralized with potassium hydroxide and concentrated by boiling until the mixture amounted to 165 parts by weight. After cooling, the insoluble potassium terephthalate was separated by filtration through a fritted glass Büchner-type funnel. The filter cake was washed several times with 45% potassium carbonate solution to remove the mother liquor, containing potassium isophthalate, until the filtrate showed no isophthalic acid. The potassium terephthalate cake was then dissolved in water, and heated to near boiling. Hydrochloric acid was added in excess to precipitate terephthalic acid. The precipitated terephthalic acid was separated by filtration through a fritted glass Büchner-type funnel and was washed repeatedly with water until the filtrate was free of hydrochloric acid and potassium chloride. The terephthalic acid filter cake on drying showed a yield of 8.9 parts by weight, indicating substantially complete recovery of the terephthalic acid from the mixture. The potassium isophthalate solution filtrate and all of the potassium carbonate wash solution filtrates were combined and acidified with hydrochloric acid. After repeatedly washing with water to remove all of the hydrochloric acid and potassium chloride, substantially complete recovery of the isophthalic acid in the original solution was obtained.

*Example 5.*—156 parts of a mixture of isophthalic acid and terephthalic acid containing approximately 85% isophthalic acid and 15% terephthalic acid by spectroscopic analysis were dissolved in a mixture of 152 parts of water and 120 parts of ammonium hydroxide solution containing 34 parts of $NH_3$. The mixture became hot but was not boiled. The insoluble ammonium terephthalate was separated by filtration through a fritted glass Büchner-type funnel. The filter cake was washed several times with a saturated solution of ammonium sulfate to remove the mother liquor containing ammonium isophthalate until the filtrate showed no isophthalic acid. The ammonium terephthalate cake was then dissolved in water and filtered, and hydrochloric acid was added slowly in excess to precipitate the terephthalic acid. The precipitated terephthalic acid was separated by filtration through a fritted glass Büchner-type funnel and was washed repeatedly with water until the filtrate was free of hydrochloric acid and ammonium chloride and ammonium sulfate. The terephthalic acid filter cake on drying showed a yield of 23 parts by weight, indicating substantially complete recovery of the terephthalic acid from the mixture. The ammonium isophthalate solution filtrate and the ammonium sulfate wash solution filtrates were all combined and acidified with an excess of hydrochloric acid. After repeatedly washing with water to remove all of the hydrochloric acid and ammonium chloride and ammonium sulfate, substantially complete recovery of the isophthalic acid in the original solution was obtained.

*Example 6.*—A mixture of 26 parts of isophthalic acid, 11 parts of terephthalic acid, 5 parts of phthalic anhydride, and 8 parts of benzoic acid were dissolved in a mixture of 21 parts of water and 36 parts of ammonium hydroxide solution containing 10 parts of $NH_3$. The mixture became hot, but was not boiled. The insoluble ammonium terephthalate was separated by filtration through a fritted glass Büchner-type funnel. The filter cake was washed several times with a saturated solution of ammonium sulfate to remove the mother liquor containing ammonium isophthalate until the filtrate showed no isophthalic acid. The ammonium terephthalate cake was then dissolved in water and filtered. The solution was heated to near boiling and hydrochloric acid in excess was added to precipitate the terephthalic acid. The precipitated terephthalic acid was separated by filtration through a fritted glass Büchner-type funnel and was washed repeatedly with water until free of hydrochloric acid and ammonium chloride and ammonium sulfate. Substantially complete recovery of the terephthalic acid in the original solution was obtained. The ammonium isophthalate solution filtrate and the ammonium sulfate wash solution filtrates were all combined and acidified with hydrochloric acid. After repeatedly washing with water to remove all of the hydrochloric acid, ammonium chloride and ammonium sulfate, substantially complete recovery of the isophthalic acid in the original solution was obtained.

We claim:

1. A process for separating mixtures of an alkali metal salt of isophthalic acid and the same alkali metal salt of terephthalic acid which comprises forming an intimate mixture of the salts with a quantity of water insufficient to dissolve all of the salts and separating a solid phase and a liquid phase from the intimate mixture.

2. A process for separating mixtures of sodium isophthalate and sodium terephthalate which comprises forming an intimate mixture of the salts with a quantity of water insufficient to dissolve all of the salts and separating a solid phase and a liquid phase from the intimate mixture.

3. A process for separating mixtures of sodium isophthalate and sodium terephthalate which comprises forming an intimate mixture of the salts with a quantity of water insufficient to dissolve all of the salts but at least sufficient to dissolve all of the sodium isophthalate and separating a solid phase and a liquid phase from the intimate mixture, said solid phase being substantially pure sodium terephthalate.

4. A process for separating mixtures of sodium isophthalate and sodium terephthalate which comprises forming an intimate mixture of the salts with a quantity of water insufficient to dissolve all of the sodium isophthalate and separating a solid phase and a liquid phase from the intimate mixture, said liquid phase being an aqueous solution of substantially pure sodium isophthalate.

5. A process for separating mixtures of sodium isophthalate and sodium terephthalate which comprises forming an intimate mixture of the salts with a quantity of water sufficient to form a saturated solution of all the sodium isophthalate present and separating a solid phase and a liquid phase from the intimate mixture, said solid phase being substantially pure sodium terephthalate and said liquid phase being an aqueous solution of substantially pure sodium isophthalate.

6. A process for separating mixtures of sodium isophthalate and sodium terephthalate which comprises dissolving said mixtures in water, concentrating the resulting solutions by evaporation with agitation until an intimate mixture comprising a solid phase and a liquid phase are obtained and separating said solid phase from said liquid phase.

7. A process for separating mixtures of sodium isophthalate and sodium terephthalate which comprises forming an intimate mixture of the salts with about 170% by weight of water based on the sodium isophthalate present in the mixture and separating a solid phase and a liquid phase from the intimate mixture.

8. A process for separating mixtures of sodium isophthalate and sodium terephthalate which comprises dissolving the mixtures in water, evaporating the resulting solutions until the amount of water present is approximately 170% by weight based on the amount of sodium isophthalate present in the mixture, and separating a solid phase and a liquid phase from the evaporated solution.

9. A process for separating mixtures of ammonium isophthalate and ammonium terephthalate which comprises forming an intimate mixture of the salts with about 120% by weight of water based on the ammonium isophthalate present in the mixture and separating a solid phase and a liquid phase from the intimate mixture.

10. A process for separating mixtures of ammonium isophthalate and ammonium terephthalate which comprises dissolving the mixtures in water, evaporating the resulting solutions until the amount of water present is approximately 120% by weight based on the amount of ammonium isophthalate present in the mixture, and separating a solid phase and a liquid phase from the evaporated solution.

11. A process for separating mixtures of sodium isophthalate and sodium terephthalate which comprises forming an intimate mixture of the salts with a quantity of water sufficient to form a saturated solution of all the sodium isophthalate present, separating a solid phase and a liquid phase from the intimate mixture and washing the solid phase with a concentrated aqueous solution of an inorganic salt of sodium.

12. A process for separating mixtures of isophthalic acid and terephthalic acid which comprises forming an intimate mixture of an alkali metal salt thereof with a quantity of water sufficient to form a saturated solution of all the sodium isophthalate present, separating a solid phase and a liquid phase from the intimate mixture, said solid phase being substantially pure alkali metal terephthalate and said liquid phase being an aqueous solution of substantially pure alkali metal isophthalate, and reconverting the separated alkali metal isophthalate and alkali metal terephthalate phases to phthalic acids by acidification with mineral acid.

13. A process for separating mixtures of an alkali metal salt of isophthalic acid and the same alkali metal salt of terephthalic acid which comprises forming an intimate mixture of the salts with a quantity of water sufficient to form a saturated solution of all the alkali meal isophhalates present and separating a solid phase and a liquid phase from the intimate mixture, said solid phase being substantially pure alkali metal terephthalate and said liquid phase being an aqueous solution of substantially pure alkali metal isophthalate.

14. A process for separating mixtures of ammonium isophthalate and ammonium terephthalate which comprises forming an intimate mixture of the salts with a quantity of water sufficient to form a saturated solution of all the ammonium isophthalate present and separating a solid phase and a liquid phase from the intimate mixture, said solid phase being substantially pure ammonium terephthalate and said liquid phase being an aqueous solution of substantially pure ammonium isophthalate.

15. A process for separating mixtures of ammonium isophthalate and ammonium terephthalate which comprises forming an intimate mixture of the salts with a quantity of water sufficient to form a saturated solution of all the ammonium isophthalate present, separating a solid phase and a liquid phase from the intimate mixture and washing the solid phase with a concentrated aqueous solution of an inorganic salt of ammonia.

16. A method of purifying mixtures of alkali metal terephthalates containing impurities including the same alkali metal salt of isophthalic acid which comprises slurrying the alkali metal terephthalate mixture with a quantity of water sufficient to form a saturated solution of all the alkali metal isophthalate and impurities present and separating a solid phase which is substantially pure alkali metal terephthalate.

17. A process for separating mixtures of the ammonium salt of isophthalic acid and the ammonium salt of terephthalic acid which comprises forming an intimate mixture of the salts with a quantity of water insufficient to dissolve all of the salts and separating a solid phase and a liquid phase from the intimate mixture.

References Cited in the file of this patent

UNITED STATES PATENTS

| Number | Name | Date |
|---|---|---|
| 1,882,335 | Mills | Oct. 11, 1932 |
| 2,572,575 | Shafer et al. | Oct. 23, 1951 |
| 2,587,666 | Toland | Mar. 4, 1952 |

FOREIGN PATENTS

| Number | Country | Date |
|---|---|---|
| 467,620 | Canada | Aug. 29, 1950 |

OTHER REFERENCES

MacArdle: "Solvents in Synthetic Org. Chem.," (Van Nostrand), page 21, 158–159 (1925).